(12) United States Patent
Wilkinson

(10) Patent No.: US 7,621,555 B2
(45) Date of Patent: Nov. 24, 2009

(54) VIEWING ASSEMBLY AND A METHOD FOR COUPLING A TRAILER TO A SELECTIVELY MOVABLE ASSEMBLY

(76) Inventor: Reginald D. Wilkinson, 533 Skyline Dr. NE., Great Falls, MT (US) 59404

(*) Notice: Subject to any disclaimer, the term of this patent is extended or adjusted under 35 U.S.C. 154(b) by 302 days.

(21) Appl. No.: 11/651,247

(22) Filed: Jan. 9, 2007

(65) Prior Publication Data

US 2007/0241536 A1 Oct. 18, 2007

Related U.S. Application Data

(60) Provisional application No. 60/792,063, filed on Apr. 15, 2006.

(51) Int. Cl.
*B60D 1/36* (2006.01)
(52) U.S. Cl. .................. 280/477; 280/478.1; 359/844
(58) Field of Classification Search ............. 280/477, 280/478.1; 359/872, 844; 248/467, 476
See application file for complete search history.

(56) References Cited

U.S. PATENT DOCUMENTS

| | | | |
|---|---|---|---|
| 3,858,966 A | 1/1975 | Lowell, Jr. | |
| 4,163,606 A | 8/1979 | Granno | |
| 4,723,788 A * | 2/1988 | Suter | 280/477 |
| 4,905,376 A | 3/1990 | Neeley | |
| 4,925,287 A * | 5/1990 | Lord et al. | 359/872 |
| 4,951,913 A | 8/1990 | Quesada | |
| 5,724,199 A | 3/1998 | Hu | |
| 5,784,213 A | 7/1998 | Howard | |
| 5,825,564 A | 10/1998 | Mazarac | |
| 5,971,555 A | 10/1999 | Wilcox et al. | |
| 5,979,927 A | 11/1999 | Hale | |
| D425,001 S | 5/2000 | Bullock | |
| 6,062,697 A * | 5/2000 | Bryant et al. | 359/841 |
| 6,076,847 A | 6/2000 | Thornton | |
| 6,079,837 A | 6/2000 | Singleton | |
| 6,102,423 A | 8/2000 | Beck et al. | |
| 6,213,608 B1 * | 4/2001 | Osgood | 359/841 |
| 6,239,926 B1 | 5/2001 | De Shazer | |
| 6,302,550 B1 | 10/2001 | Krieg | |
| 6,409,200 B1 * | 6/2002 | Glass | 280/477 |
| 6,422,585 B1 | 7/2002 | Glass | |
| 6,446,999 B1 | 9/2002 | Davis, Jr. | |
| 6,499,851 B1 | 12/2002 | Kelly et al. | |
| D474,432 S | 5/2003 | Good | |
| 6,619,685 B2 | 9/2003 | Teague | |
| 6,955,437 B1 | 10/2005 | Roberts | |
| 7,005,974 B2 | 2/2006 | McMahon et al. | |
| 7,057,500 B1 | 6/2006 | Belloso | |
| 7,125,034 B2 | 10/2006 | Winckler | |
| 7,216,885 B1 * | 5/2007 | Stopka | 280/477 |
| 7,284,869 B1 * | 10/2007 | Weaver | 359/872 |
| 2002/0089148 A1 * | 7/2002 | Glass | 280/477 |
| 2004/0094934 A1 * | 5/2004 | Teague | 280/477 |
| 2007/0241535 A1 * | 10/2007 | Salyers | 280/477 |

* cited by examiner

*Primary Examiner*—Paul N Dickson
*Assistant Examiner*—Maurice Williams
(74) *Attorney, Agent, or Firm*—John G. Chupa

(57) ABSTRACT

An assembly 10 which may be selectively and removably attached to a selectively movable assembly, such as a vehicle 90 and which provides the driver 94 of the selectively movable assembly 90 with an image of the trailer connection portion 99 of the selectively movable assembly 90 as the selectively movable assembly 90 is moved toward a trailer 102.

4 Claims, 5 Drawing Sheets

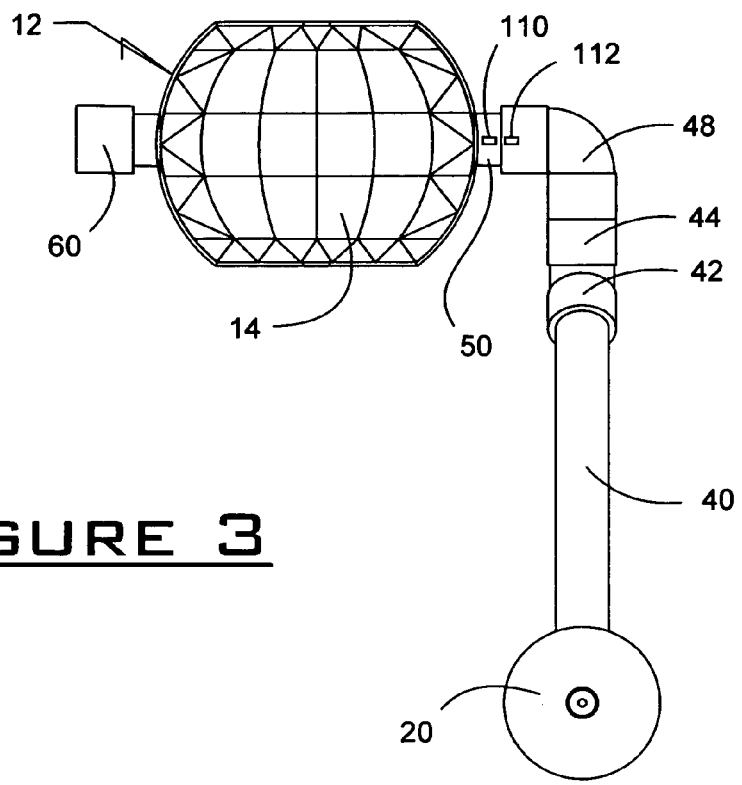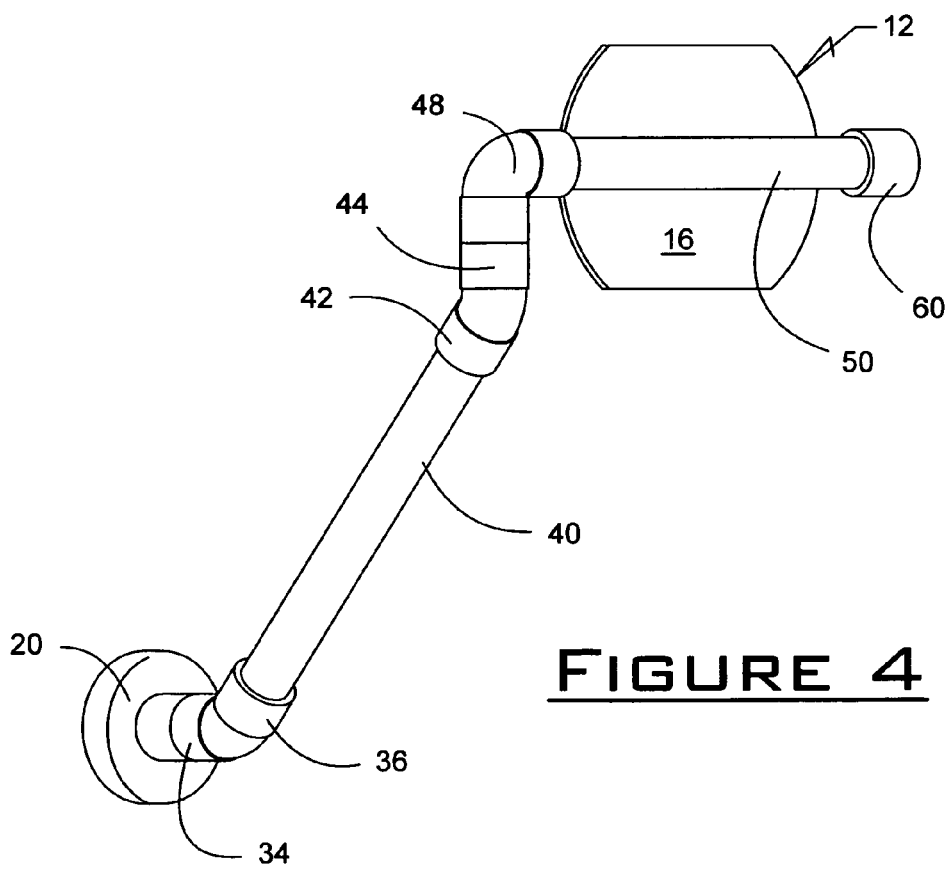

VIEWING ASSEMBLY AND A METHOD FOR COUPLING A TRAILER TO A SELECTIVELY MOVABLE ASSEMBLY

This application claims the benefit of U.S. Provisional Application No. 60/792,063 Filing Date Apr. 15, 2006.

GENERAL BACKGROUND

1. Field of the Invention

The present invention generally relates to a viewing assembly and to a method for coupling a trailer to a selectively movable assembly and more particularly, to an assembly and to a method which allows those residing within a passenger compartment of a selectively movable assembly, such as by way of example and without limitation a vehicle, to efficiently and accurately couple the selectively movable assembly to a trailer.

2. Background of the Invention

Many diverse types of trailers are used to selectively haul goods and material and/or to provide shelter and accommodation for individuals. While many such diverse types of trailers are indeed utilized, they typically all require some sort of attachment to a vehicle or other type of selectively movable assembly in order to allow such trailers to become mobile and to increase their overall usefulness.

Typically, the selectively movable assembly which is to be connected to a trailer has a trailer connection portion or member or assembly which may comprise what is sometimes referred to as a "kingpin" (e.g., a "kingpin" is permanently attached to the front underside of a trailer) and which must be placed within a certain location relative to the trailer to be towed (e.g., typically the "kingpin" portion of the selectively movable assembly slides into a slot on what is typically referred to as a "fifth wheel plate" which is typically and permanently attached to a frame member of the towing vehicle (i.e., a semi-tractor trailer connection)). Such placement typically requires the selectively movable assembly to be driven in a very precise manner towards the trailer (e.g., in a manner which allows the trailer connection portion or trailer connection assembly to actually receive or to be connected to a portion of the trailer which is often know as "the hitch or the tongue portion").

The placement of the trailer connection member/portion/assembly to the trailer is often difficult since the trailer connection member/portion/assembly and the portion of the trailer which is to be coupled or connected to the trailer connection member/assembly/portion are each typically out of the sight of the driver and the passengers of the selectively movable assembly. This "lack of view" of the trailer connection portion/assembly/member of the selectively movable assembly and of the portion of the trailer which is to be coupled to the trailer connection portion/assembly/member makes the required precise movement of the selectively movable assembly difficult to accomplish and requires much effort and time in order to allow such desired connection to occur (e.g., oftentimes an individual is required to stand by the trailer and to signal to the driver of the selectively movable assembly to move the selectively movable assembly in certain manner in order to accomplish the desired connection).

There is therefore a need and it is an non-limiting objective of these various inventions to provide a method and an apparatus which provides for an efficient connection of a selectively movable assembly to a trailer and to a method and an assembly which allows a driver of a vehicle to continually view the trailer connection portion/assembly/member of a selectively movable assembly in order to allow the selectively movable assembly to be quickly and efficiently coupled to a trailer. These and other benefits of the various inventions are more fully set forth below. It should be appreciated that the foregoing term "trailer connection portion/member/assembly" generally refers to any tangible entity which allows a selectively movable assembly to be coupled to a trailer. Further, each of the terms "trailer connection member," "trailer connection assembly" and "trailer connection portion" each refer to this tangible entity.

SUMMARY OF THE INVENTION

It is a first non-limiting object of the present invention to provide a method and an assembly which allows a selectively movable assembly to quickly and efficiently and consistently be coupled to a trailer.

It is a second non-limiting object of the present invention to provide an assembly which allows those residing within the passenger compartment of a vehicle to view the connection between the vehicle and a trailer.

It is a third non-limiting object of the present invention to provide a methodology which allows those residing within the passenger compartment of a vehicle to view the connection between a vehicle and a trailer.

It is a fourth non-limiting object of the present invention to provide an assembly which provides the operator of a selectively movable assembly a continual view of the trailer coupling portion of the selectively movable assembly and which is cost effective, has a relatively un-complicated design which reduces the likelihood of failure due to wear, which obviates the need for tools and other mounting apparatuses, which is aesthetically pleasing, and which is removably but securely attached to the selectively movable assembly in a manner which allows such attachment to remain integral even in a wide variety of climatic conditions.

According to a first non-limiting aspect of the present invention, a viewing assembly for use with a vehicle of the type having a trailer coupling assembly and a passenger compartment is provided. Particularly, the viewing assembly includes a first portion which resides upon the vehicle; and a second mirrored portion which selectively and movably resides within the first portion and which provides a view of the trailer coupling assembly to one who resides within the passenger compartment of the vehicle.

According to a second non-limiting aspect of the present invention, a viewing assembly for use with a vehicle of the type having a trailer coupling assembly and a passenger compartment is provided. Particularly, the viewing assembly includes a magnetic base member which is selectively attached to an exterior surface of the vehicle which is remote from the passenger compartment; a first elbow member which is coupled to the magnetic base member; a second straight member which is coupled to the first elbow member; a third elbow member which is coupled to the second straight member; a fourth member which is selectively and rotatably coupled to the third member; and a mirror which is rotatably received within the fourth member and which provides a image of the trailer coupling assembly to those residing within the passenger compartment.

According to a third non-limiting aspect of the present invention, a viewing assembly which provides an unobstructed view of a trailer coupling assembly to one who resides within a passenger compartment of a vehicle is provided. Particularly, the viewing assembly includes a first elbow which includes a first portion which orthogonally projects from a portion of the vehicle along a first axis, the first portion further including a magnet which selectively and removably attaches the first portion of the first elbow to the portion of the vehicle, and wherein the first elbow including a second portion which terminates into the first portion and which forms an acute angle with respect to the first portion; a body which includes a first end which is selectively and removably received within the second portion of the first elbow which extends from the first elbow along a certain axis, and which includes a second end; a second elbow which includes a first portion which selectively and removably receives the second end of the body and a second portion which lies along an axis which is parallel to the portion of the vehicle upon which the magnet is attached; and a mirror portion which includes a member which rotatably resides within the second portion and which further includes a mirror which is disposed upon the member.

According to a fourth non-limiting aspect of the present invention, a method for connecting a selectively movable assembly to a trailer is provided. Particularly, the selectively movable assembly is of the type having a trailer connection member and wherein the method includes the steps of placing an assembly of members upon an external surface of the vehicle; placing a mirror onto the assembly of members; and moving the mirror within the assembly of members until the mirror occupies a position in which the mirror provides a view of the trailer connection member; and using the mirrored view to connect the trailer to the trailer connection member.

These and other features, aspects, and advantages of the present inventions will become apparent to those of ordinary skill in the art by reference to the following detailed description of the preferred embodiment of the invention, including the subjoined claims, and by reference to the following drawings.

BRIEF DESCRIPTION OF THE DRAWINGS

FIG. 3 is a front assembled view of the viewing assembly which is shown in FIGS. 1 and 2.

FIG. 4 is a back assembled view of the viewing assembly which is shown in FIGS. 1, 2, and 3.

DETAILED DESCRIPTION OF THE PREFERRED EMBODIMENT OF THE INVENTION

Figure 1:
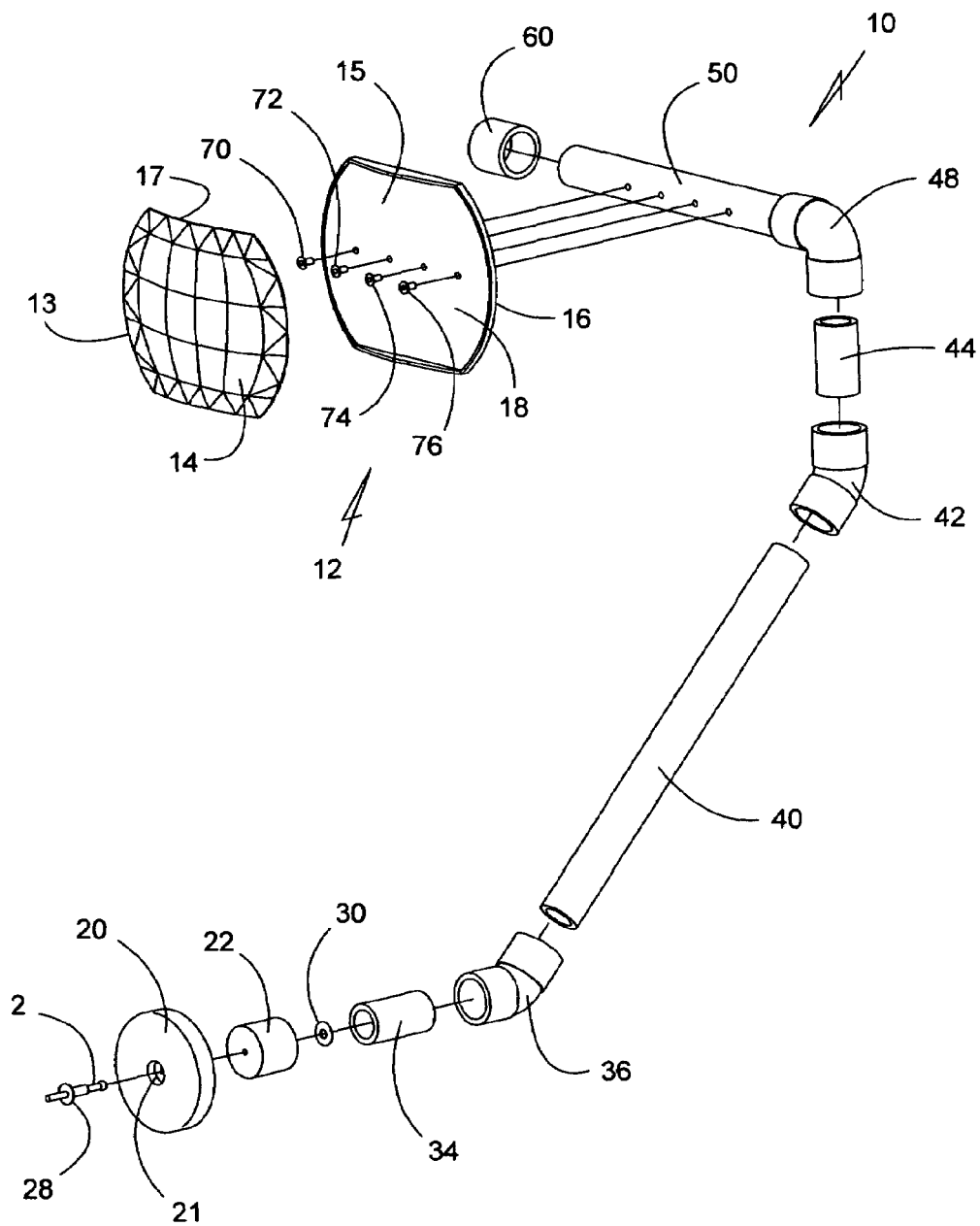
FIG. 1 is an unassembled perspective view of the viewing assembly which is made in accordance with the teachings of the preferred embodiment of the invention.

Referring now to FIG. 1, there is shown a viewing assembly 10 which is made in accordance with the teachings of the preferred embodiment of the invention.

Particularly, the viewing assembly 10 includes a mirror portion 12 having, in one non-limiting embodiment, a first member 13 with a front reflective convex surface 14, and a second member 15 having the substantially same shape as member 13 and further having an opaque back surface 16. It should be appreciated that surface 14 may be multi-faceted and that the members 13 and 15 may be of any desired shape and size. The member 13 includes an opaque back surface 17 and the member 15 includes an opaque front surface 18. In one non-limiting embodiment of the invention, the mirror portion 12 is generally rectangular in shape, although other shapes may be utilized and that nothing in this description should be construed as limiting the invention to a particular size or shape of a mirror and that was is shown is for illustrative purposes only.

The viewing assembly 10 further includes a generally circular shaped magnet 20 having a central "through type opening" or orifice 21 and a member 22 which may, in one non-limiting embodiment, comprise a commercially available SCH 40-PVC ½ inch end cap and which is adapted to be coupled to the magnet 20 by the use of a rivet 28 (e.g., the rivet 28 is placed through the opening 21 and through the member 22). In one non-limiting embodiment of the invention, the rivet 28 comprises a commercially available aluminum rivet having a diameter of about 3/16 of an inch and a grip of about ¼ of an inch.

The viewing assembly 10 further includes a commercially available rivet "back up plate" 30 which is attached to the member 22 and which frictionally receives the grip portion 2 of the rivet 28 as it extends through the member 22 (e.g., the plate 30 cooperates with rivot 28 to secure magnet 20 onto member 22), and a member 34 which, in one non-limiting embodiment, comprises a SCH 40 PVC pipe or SCH 315 thinwall pipe having an outside diameter of about ⅞th of an inch and a length of about 1¼ of an inch. The member 34 is frictionally coupled to and receives the member 22, in one non-limiting embodiment of the invention, although the member 34 may be coupled to the member 22 by substantially any other desired coupling methodologies (e.g., such as by the use of glue and/or cement material). In fact, all required coupling, in an alternate embodiment of the invention, may be achieved by such use of glue or other commercially available material.

The viewing assembly 10 further includes a member 36 which, in one non-limiting embodiment of the invention, comprises a commercially available SCH 40 PVC elbow having a forty-five degree bending angle and an outside diameter of about 1⅛ of an inch. The member 36 selectively and frictionally receives the member 34 and/or may be coupled to the member 34 by substantially any other desired technique or strategy (e.g., such as by the use of glue and/or cement and/or other materials or physical entities). As is further shown, the viewing assembly 10 also includes a straight member or pipe 40 which, in one non-limiting embodiment of the invention, comprises a commercially available SCH 40 PVC pipe having a length of about 9 inches and an outside diameter of about ⅞ of an inch. The pipe or body member/portion 40 is selectively and frictionally received into the elbow 36 and may be connected to the elbow 36 by the use of other and/or additional coupling techniques or strategies, such as by the use of glue or another type of adhesive material.

The viewing assembly 10 further includes a member 42 which is made to selectively and frictionally receive the pipe or body member 40 and which may, in one non-limiting embodiment of the invention, comprise a commercially available SCH 40 PVC elbow member having a forty five degree angle of bend and an inside diameter of about ½ of an inch. Other connection methodologies and techniques may be utilized to attach the member 42 to the member 40 (e.g., such as by the use of glue and/or cement).

The viewing assembly 10 further includes a member 44 which is frictionally received by the member 42 and/or attached to the member 42 by a conventional attachment methodology and/or technique. In one non-limiting embodiment, the member 44 comprises a commercially available ½ inch SCH 40/315 PVC pipe having an outside diameter of about ⅞ of an inch and a length of about 1¼ of an inch. The viewing assembly 10 further includes an elbow member 48 which, in one non-limiting embodiment of the invention, comprises a commercially available SCH 40 PVC elbow having a 90 degree angle of bending and an outside diameter of about 1⅛ of an inch. The member 44 is selectively and frictionally placed within the member 48 or connected to the member 48 by substantially any other desired and conventional securing technique and/or methodology.

Figure 2:
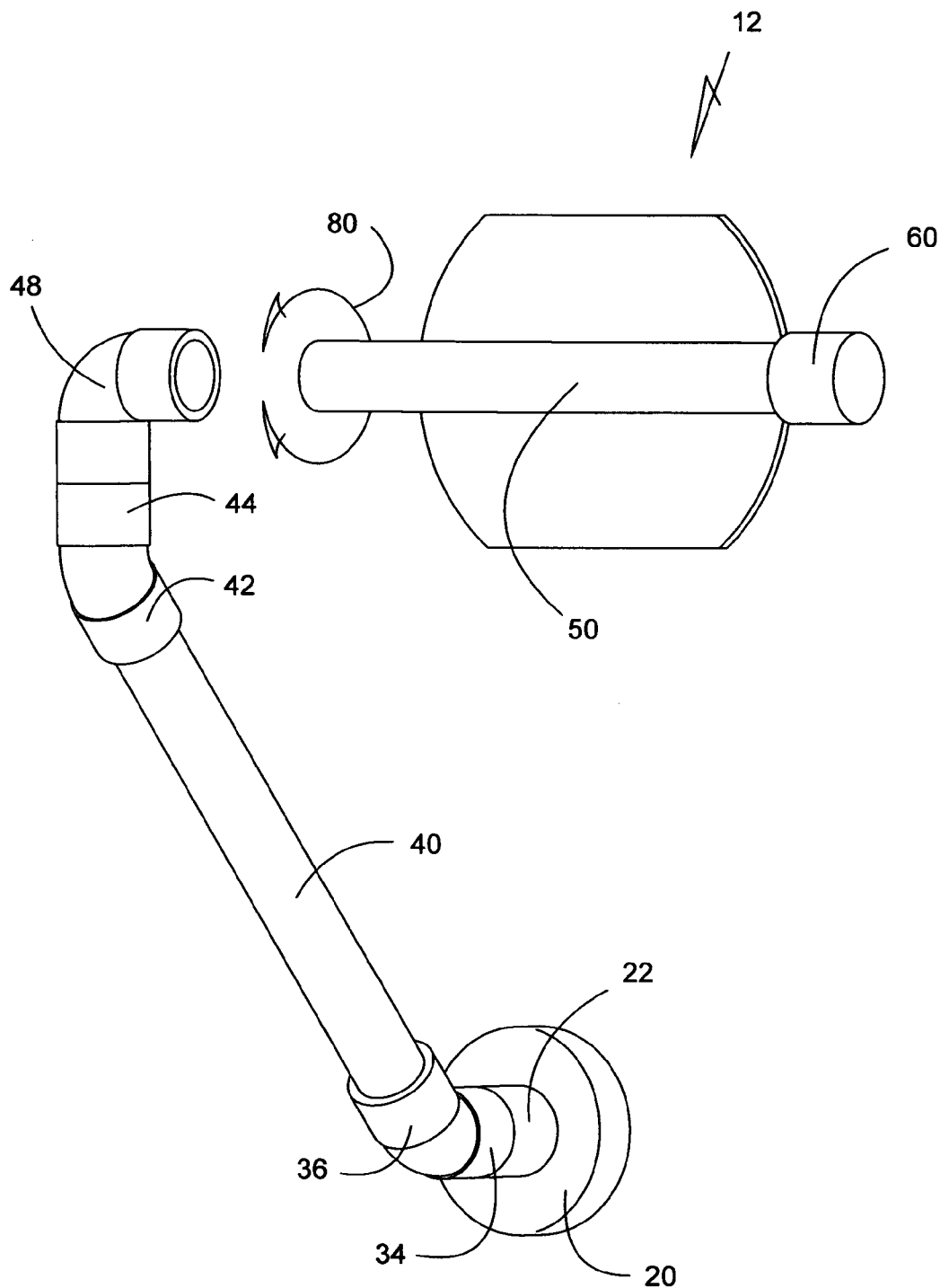
FIG. 2 is a substantially assembled perspective view of the viewing assembly which is made in accordance with the teachings of the preferred embodiment of the invention.

The viewing assembly 10 further includes a relatively straight member or pipe 50 which, in one non-limiting embodiment of the invention, comprises a commercially available SCH 40 PVC pipe having an outside diameter of about ⅞ of an inch and a length of about 7¼ inches. The member 50 may be selectively and frictionally received by the member 48 and/or secured to the member 48 by the use of conventional fastener methodologies or techniques. The viewing assembly 10 further includes an end cap portion or member 60 which selectively and frictionally receives the member 50 and/or is attached to the member 50 by any other commercially available techniques and/or strategies. Further, the surface 16 of member 15 is attached to the member 50 by the use of four rivets 70, 72, 74, 76. Rivets 70, 72, 74, 76 each comprise a commercially available aluminum rivet having a diameter of ⅛ of an inch and a grip range of about 3/16 to ¼ of an inch and may be oriented through the surface 16 in any desired direction or spatial orientation. The surface 17 of the member 13 may be attached to the surface 18 of the member 15 by glue or some other conventional fastener strategy and methodology. It should be appreciated that the member 50 (see FIG. 2) may be selectively rotatable around axis 80 as it resides within the member 48 and that the combination of the members 48, 44, and 42 may cooperatively form a first elbow portion and that the members 22, 34, 36 may cooperatively form a second elbow portion. It should be appreciated that the various previously delineated components or portions of the viewing assembly 10 (with the exception of the convex reflective portion 14) may be constructed from polyvinylchloride (e.g., "pvc" material) or from another material such as plastic or a composite material. It should be further appreciated that each of the members 20, 22, 30, 34, 36, 40, 42, 44, 48, 50, 60, and 12 are substantially rigid and that there is only "one moving part" (e.g., the rotating member 50).

Figure 5:
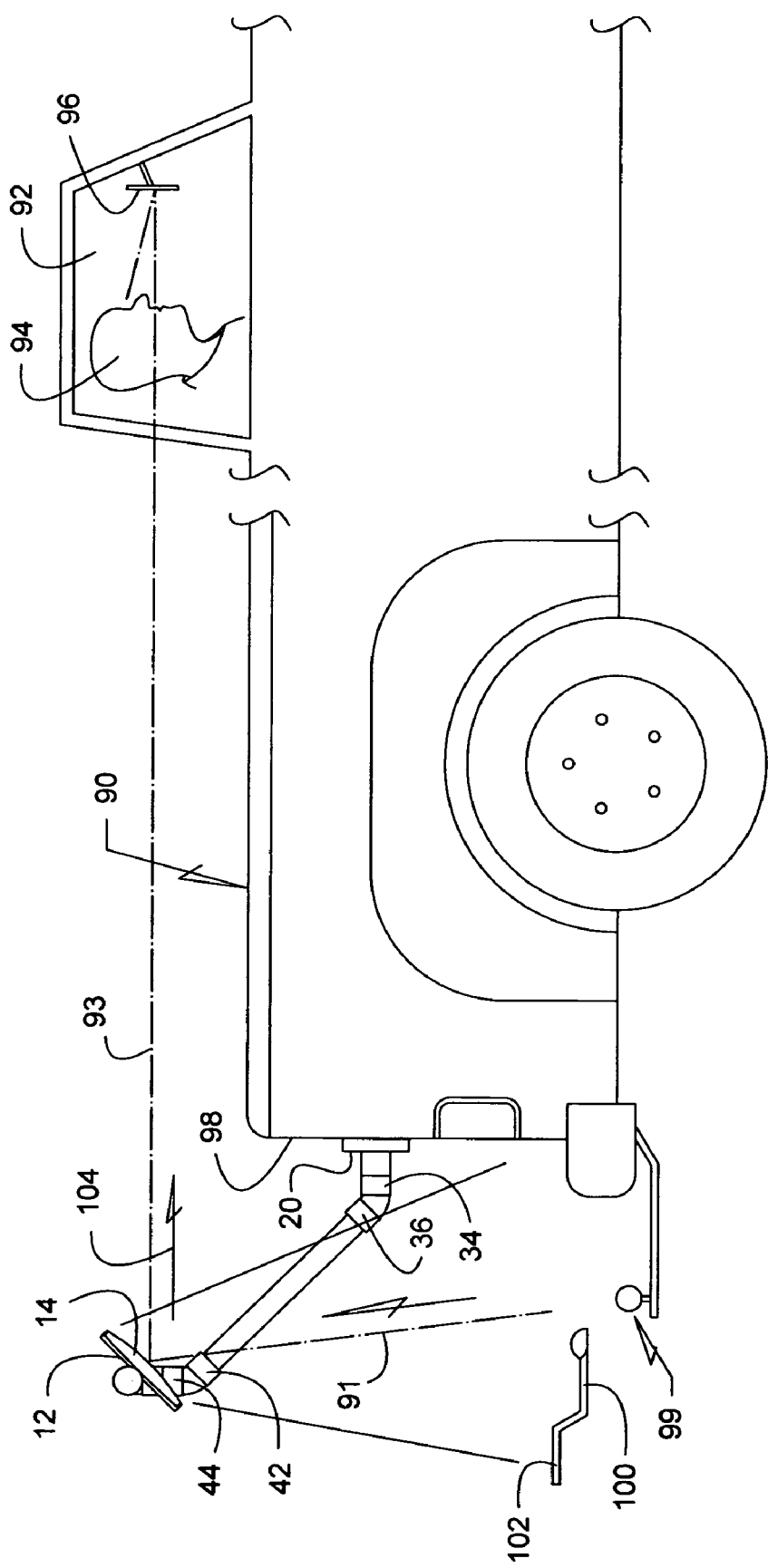
FIG. 5 is a side view of the viewing assembly which is shown in FIGS. 1-4 and which is shown in operative deployment upon a selectively movable assembly.
Figure 6:
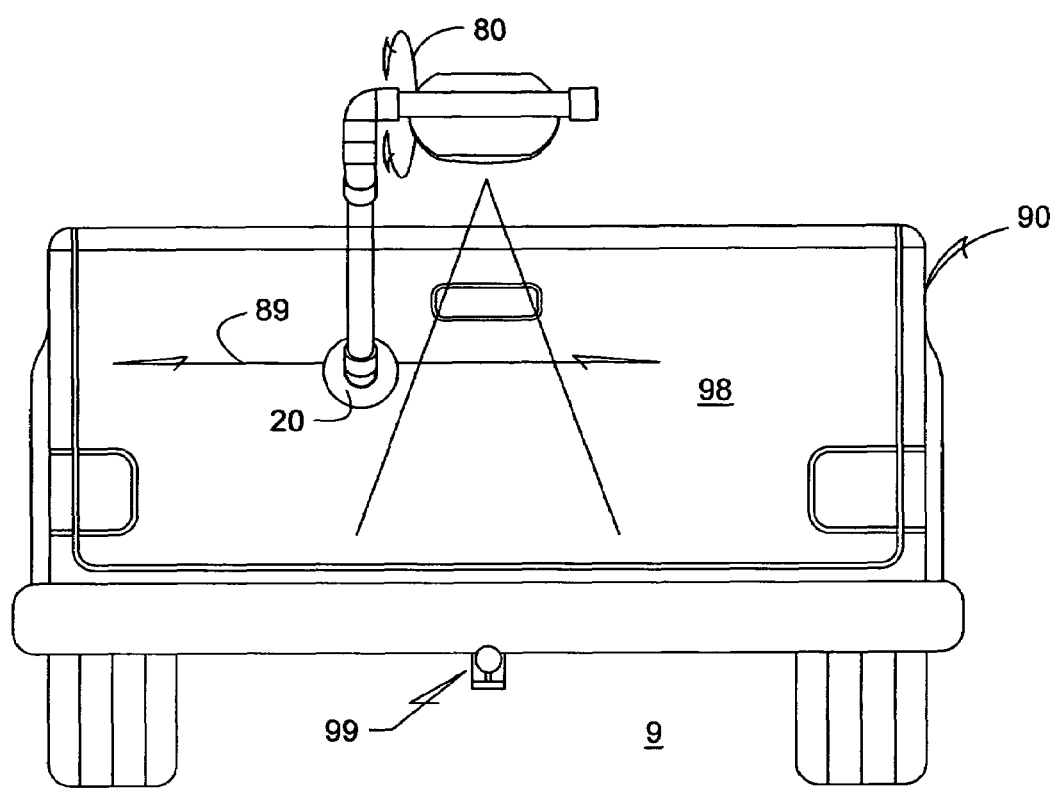
FIG. 6 is a back view of the selectively movably assembly which is shown in FIG. 5.

In operation, as is perhaps best shown in FIGS. 5 and 6, a selectively movable assembly, such as truck 90 which includes a passenger compartment 92 where a driver 94 traditionally resides may utilize the viewing assembly 10. Particularly, the selectively movable assembly 90 is of the type which typically includes at least one mirror, such as rear view mirror 96. It should be appreciated that the provided mirror or mirrors may be placed within or may be placed outside of the passenger compartment 92 and that nothing in this description is to be construed to limit the various inventions to a particular type or to a particular kind of selectively movable assembly. Moreover, the selectively movable assembly 90 includes a back surface 98, such as a tail gate, and a trailer connection portion or member 99 (e.g., such as, by way of example and without limitation a kingpin or other member) which may be selectively and precisely aligned with the trailer connecting member (e.g. a trailer tongue or hitch portion) 100 which emanates from a trailer 102 which is to be selectively coupled to the selectively movable assembly 90 and which is to be towed from the selectively movable assembly 90. It should be appreciated that portion/member 99 may be of substantially any shape, size, of configuration and that portion 100 may also be of substantially and shape, size, or configuration.

To facilitate the connection of portion 99 to portion 100, after the assembly 10 is assembled, the magnet 20 is attached to the portion 98 (e.g., the magnetic energy which emanates from the magnet 20 causes the magnet to adhere to the portion 98 which includes some metal material), the mirrored surface 14 is directed along directional line 104 (e.g., toward the passenger compartment 92) and the member 50 is rotated along the axis 80 until the mirrored surface 14 provides the at least one mirror 96 an image of the portion 99 along view path 93 (e.g., the image of portion 99 is captured by the mirror 12 along view path 91). It should be appreciated that the axis 80 is parallel to the portion 98 of the selectively movable assembly 90 and is parallel to the axis 89 which passes through the magnet 20, which lies upon the portion 98 and which is parallel to the ground 9 upon which the selectively movable assembly 90 resides. It should be further appreciated that member 36 forms a 45 degree angle with respect to surface 98 and member 34 orthogonally projects from surface 98 and that the viewing assembly 10, when assembled upon portion 98, forms a generally "c" shape.

In this manner, as the selectively movable assembly is moved toward the trailer 102, the driver 94 is given a continual image of the portion 99 (e.g., the provided image is presented to the driver/operator 94 within the at least one mirror 96) and, as the portion 99 becomes proximate to the portion 100, the image given to the driver 94 is of both the portions 99 and 100, allowing the driver 94 to efficiently and accurately place the portion 99 in desired alignment with the portion 100. One may, in an alternate embodiment of the invention, place a mark 110 upon the portion 50 and a corresponding mark 112 upon the portion 48 in order to allow the mirror 12 to always be located in the desired location to provide the desired image.

It should be realized that the magnet 20 will cause the viewing assembly 10 to be selectively and removably coupled to the portion 98 in a wide variety of climatic conditions and that such a magnet is therefore operationally superior to the use of a "suction cup" which may become dislodged in cold or wet weather. Further, it should be realized that the use of the magnet 20 obviates the need for any tools or installation materials (e.g. tools or fasteners) with which to adhere the viewing assembly 10 to the selectively movable assembly 90, thereby allowing the installation to be relatively efficient and to obviate the need for holes or other types of structural modifications to the selectively movable assembly 90, thereby providing a more pleasing overall aesthetic appearance since the viewing assembly may be removed from the selectively movable assembly 90 when not in use and the selectively movable assembly 90 will have the same appearance as it had before the viewing assembly 10 was deployed upon it. Further, it should be appreciated that the overall design of the viewing assembly is relatively uncomplicated and does not require a telescoping assembly or a "ball and socket" type assembly which requires many moving parts and which is prone to wear and fatigue type failure. Further, it should be appreciated that the end cap portion 60 provides a convenient and safe way for a user to "twist" member 50 in order to adjust the angle of view without damaging member 15 or the viewing assembly 10. It should be further appreciated that the term "trailer" refers to any assembly which is to be selectively connected to a selectively movable assembly and that nothing in this description is meant to limit the present inventions to a particular type of trailer. Further, the general "c" shape of the viewing assembly 10 importantly allows for the assembly 10 to be placed upon the selectively movable assembly, such as truck 90, to capture the view of the trailer connection portion 99 and of portion 100, and to provide these images to the driver/operator 94. Placement of the assembly 10 upon the selectively movable assembly, such as truck 90, provide for a shorter distance that the captured image must be transmitted to the driver/operator 94 (as opposed to placing the assembly 10 upon the trailer 102), thereby providing a consistently sharper and cleaner image.

It is to be understood that the various delineated inventions are not restricted to the exact embodiments which have been described above, but that various changes and modifications may be made without departing from the spirit and the scope of the inventions as they are delineated in the following claims. In an additional and non-limiting embodiment, commercially safety tape may be applied to end cap 60 in order to enhance the ability of a user to grab the end cap 60.

What is claimed is:

1. A viewing assembly comprising a mirror portion having a convex reflective front surface and a convex opaque back surface; a circular magnet; an elbow member having a bend of about forty-five degrees and having a pair of opposed ends, wherein a first of said pair of opposed ends is coupled to said circular magnet; a straight member having a first end which is coupled to a second of said pair of opposed ends of said elbow member, thereby causing said straight member to form an angle of about forty-five degrees with respect to said magnet and wherein said straight member has a second end; a second elbow member having a bend of about forty five degrees and further have first and second opposed ends, wherein said first of said opposed ends of said second elbow member is coupled to said second end of said straight member; a second straight member having first and second opposed ends, wherein a first of said opposed ends of said second straight member is coupled to second opposed end of said second elbow member, thereby causing said second straight member to form an angle of about forty-five degrees with respect to said first straight member; a third elbow member having first and second opposed ends, wherein said first opposed end of said third elbow member is coupled to said second opposed end of said second straight member; a third straight member having first and second opposed ends, wherein said first opposed ends of said third straight member is rotatably received within said second opposed end of said third elbow member, wherein said third straight member lies above said magnet is parallel to said magnet; and a cap which is coupled to said second opposed end of said third straight member, and wherein said third straight member is coupled to said opaque back surface of said mirror portion such that said mirror portion is positioned above said magnet and is selectively rotatable about an axis and said axis is parallel to a second axis which passes through said magnet and wherein said mirror portion is selectively rotatable in a direction toward said magnet and in a second direction-away from said magnet.

2. The viewing assembly of claim 1 wherein elbows of said members are formed from plastic material.

3. The viewing assembly of claim 1 wherein said mirror is rectangular.

4. The viewing assembly of claim 3 wherein said viewing assembly is "C" shaped.

* * * * *